Patented Oct. 31, 1950

2,527,509

UNITED STATES PATENT OFFICE 2,527,509

PRODUCTION OF NITRILE CONDENSATION PRODUCTS FROM CYANOBUTADIENE

Sidney James Allen, London, and James Gordon Napier Drewitt, Spondon, near Derby, England, assignors to Celanese Corporation of America, a corporation of Delaware No Drawing. Application July 22, 1947, Serial No. 762,800. In Great Britain March 15, 1945

Section 1, Public Law 690, August 8, 1946
Patent expires March 15, 1965

3 Claims. (Cl. 260—465.4)

This invention relates to the production of organic compounds and is based upon the discovery that 1.3-butadiene-4-nitrile and analogous compounds are of great value in the production of intermediates for polymers, wetting agents, emulsifying agents and numerous other applications.

We have found that 1.3-butadiene-4-nitrile and 1- or 4-substitution products thereof combine very smoothly with substances containing labile hydrogen atoms attached to an atom of an element which forms a dioxide (i. e. a compound in which the ratio of atoms of oxygen to atoms of the element is 2:1) which is gaseous at ordinary temperatures, namely carbon, sulphur, nitrogen or chlorine, for example nitromethane and other primary or secondary nitroparaffins, aldehydes and ketones, malonic esters, cyanacetic esters, malononitrile, aceto-acetic esters and other $\beta$-ketonic esters, aryl-aceto-nitriles, for example benzyl cyanide, aryl acetic esters, for example phenyl acetic ester, aryl methane sulphonamides, for example benzyl sulphonamide and fluorene; thiols, including mercaptans and hydrogen sulphide; amines, including hydrazine and its derivatives, amides and ammonia; and hydrogen chloride. Moreover the main products are those of 1.4 addition.

The above compounds contain the labile hydrogen atom or atoms attached to a nitrogen, sulphur or chlorine atom or attached to a carbon atom having an adjacent activating group such as an aldehyde or ketone group, an ester group, a nitrile group, a sulphonamide group or an aryl group. In the case of ester, nitrile, sulphonamide and aryl activating groups, it is preferred to have two such groups attached to one carbon atom to render the hydrogen attached to the same carbon atom highly labile.

Generally the reaction is assisted by means of alkaline catalysts, of which caustic soda or other caustic alkali, sodium carbonate and the alkali cyanides, for example sodium cyanide, are the most important. However, other catalysts, for example sodium alcoholates, such as sodium methoxide, sodium sulphite, trimethyl benzyl ammonium hydroxide and similar quaternary bases can also be used. In some cases, particularly where the compound containing the labile hydrogen atom is an amine, no catalyst at all need be used, or alternatively acid catalysts, for example acetic acid, sulphuric acid or hydrated copper sulphate may be used. The addition of hydrogen chloride requires no catalyst.

Many of the reactions take place at ordinary temperatures merely on standing. However, where the reaction is sluggish, the reaction rate may be accelerated by applying gentle heat, or even by heating up to 80° or more. The reaction may be effected in presence or absence of an inert diluent.

Where the compound to be reacted with the butadiene nitrile contains only one labile hydrogen atom, the proportions of reagents used are relatively immaterial and are best arranged with a view to obtaining the maximum yield from the more expensive reagent, i. e. the cheaper reagent is used in excess. Where the compound to be reacted with the butadiene nitrile contains two or more labile hydrogen atoms, the proportions of the reagents are, however, chosen with a view to the avoidance as far as possible of undesired by-products. Thus if only one mole of butadiene nitrile is required to reaction with a compound containing more than one labile hydrogen atom, then an excess of the latter compound is used, for instance an excess of 5 to 10 or even 20 moles. In some cases, e. g. with the primary nitroparaffins, the use of an equimolecular proportion of a base, especially a strong base such as caustic soda or trimethyl benzyl ammonium hydroxide, prevents addition of more than one mole of the butadiene nitrile. If all the labile hydrogen atoms are to be displaced, then an excess of the butadiene nitrile is used.

It will thus be seen that the invention permits of the production of a very wide variety of intermediate products. In the case of combining the butadiene nitrile with nitromethane or other primary or secondary nitroparaffins, the products are unsaturated nitro-nitriles, which may be reduced, for example by hydrogenation in presence of Raney nickel or other hydrogenation catalyst, to a diamine or polyamine. Alternatively, the nitrile may be saponified before reduction so that upon reduction the product is an amino- mono- or polycarboxylic acid.

In the case of ketones, it is found that the butadiene nitrile begins to add to the carbon atom adjacent to the keto group which carries the least number of hydrogen atoms. For example, in the case of condensing butadiene nitrile with methyl ethyl ketone, the first product is formed by the addition of one mole of the butadiene nitrile to the carbon atom of the methylene group. Similarly, the second mole of butadiene nitrile adds to the same carbon atom, and generally with ketones it is only when one of the carbon atoms adjacent to the ketone group is already completely saturated with butadiene nitrile residues that addition takes place to the carbon atom on the other side of the keto group. Thus with acetone it is possible to obtain an addition of three moles of butadiene nitrile to one of the carbon atoms. In the case of aldehydes, the reaction generally proceeds most smoothly with those aldehydes which contain only one hydrogen atom attached to the carbon atom adjacent to the aldehyde group, for example isobutyraldehyde and diethyl acetaldehyde. Acetaldehyde and other straight chain aldehydes have a tendency to resinify in presence of the alkaline catalyst, but complications of this character may in some cases be avoided by mixing the butadiene nitrile with the alkaline catalyst and then adding the acetaldehyde or other aldehyde slowly. It may, for example, be added in the form of vapour. The products of the addition of butadiene nitrile to aldehydes and ketones are unsaturated aldehydo- or keto-nitriles. They may be reduced to the corresponding amino-carbinols, or may first be hydrolysed and then reduced so as to make the corresponding hydroxy carboxylic acids. Reduction in presence of ammonia serves to replace the carbonyl group $$-\overset{|}{C}=O$$

by an amino alkyl group $$-\overset{|}{C}H.NH_2$$

so that if carried out directly on the unsaturated aldehydo- or keto-nitriles it gives rise to polyamines and if carried out after saponification yields amino-carboxylic acids. Alternatively the unsaturated aldehydo- or keto-nitriles may be treated with hydrogen cyanide or with ammonium cyanide with or without previous saponification, and may then be reduced with or without previous saponification of the nitrile group so added to obtain oxycarboxylic acids, amino-oxycarboxylic acids, amino-alcohols, amino-carboxylic acids and polyamines.

The products of addition of butadiene nitrile to malonic esters, malononitrile, cyanacetic esters, aceto-acetic esters and aryl-aceto-nitriles may similarly be reduced either before or after saponification of the nitrile groups and before or after saponification of any ester groups present.

Addition of butadiene nitrile to organic thiols, for example aliphatic or aromatic mercaptans or thio-phenols, produces unsaturated alkyl-, aralkyl- or aryl-thio-ether-nitriles, which, as before, may be reduced to the corresponding saturated alkyl-, aralkyl- or aryl-thio-ether-amine or may be saponified and then reduced to the corresponding alkyl-, aralkyl- or aryl-thio-ether-carboxylic acid.

Hydrogen sulphide likewise reacts quite readily with butadiene nitrile, particularly in presence of a strong base, so as to replace the hydrogen atoms by the butadiene nitrile residue. The product is δ. δ' -thio-dipentenoic nitrile. Saponification or reduction in either order may be carried out as before.

Important bodies containing labile hydrogen atoms for use according to the present invention are ammonia, amides, e. g. acetamide, and amines, and of these the most important are the primary amines, including the primary diamines such as ethylene diamine, trimethylene diamine, tetramethylene diamine, pentamethylene diamine and hexamethylene diamine. Generally these substances do not require the use of a catalyst, being already sufficiently basic in themselves. In some cases, the addition of acid is of advantage. By reacting one mole of a diprimary amine, such as ethylene diamine, with two moles of butadiene nitrile, there is produced a diamino-dinitrile, which on reduction yields a tetramine which is suitable for conversion into a polyamide, according to our earlier U. S. applications S. No. 583,841 filed March 20, 1945 and S. No. 591,408 filed May 1, 1945, now both abandoned.

Saponification followed by reduction produces a dicarboxylic acid containing two secondary amino groups. Generally with these additions of butadiene nitrile to ammonia or amines, it is advisable not to distil the product, since the reaction appears to be to some extent reversible. This is of very little moment if the substance is to undergo a further treatment, for example reduction and/or saponification, since such a treatment can be applied directly to the crude reaction product.

In some cases, the presence of a strong base such as caustic soda produces a simultaneous saponification of the nitrile group of the butadiene nitrile. For example, by treating butadiene nitrile with ammonium hydroxide and ammonium carbonate in presence of caustic soda or other strong mineral base, the amino-pentenoic acid may be produced directly without the necessity for a subsequent saponification.

So far the description has been limited to the addition to compounds containing labile hydrogen atoms of 1.3-butadiene-4-nitrile. 1.4-substitution products of the butadiene nitrile may be used, for example sorbonitrile $$CH_3.CH=CH.CH=CH.CN$$

cinnamal acetonitrile $C_6H_5.CH=CH.CH=CH.CN$, α-cyano-sorbic acid $$CH_3.CH=CH.CH=\underset{COOH}{\overset{|}{C}}.CN$$

or its esters, cinnamal cyanacetic acid $$C_6H_5.CH=CH.CH=\underset{COOH}{\overset{|}{C}}.CN$$

or its methyl or ethyl ester, cinnamal malononitrile $$C_6H_5.CH=CH.CH=\underset{CN}{\overset{|}{C}}.CN$$

and cinnamal benzyl cyanide $$C_6H_5.CH=CH.CH=\underset{C_6H_5}{\overset{|}{C}}.CN$$

All these compounds are of the general formula $$\overset{|}{C}=CH-CH=\underset{|}{C}-CN$$

They are all 1- and/or 4-derivatives of 1.3-butadiene-4-nitrile $CH_2=CH.CH=CH.CN$ itself.

If the compound containing labile hydrogen be represented by the formula $XH_n$ where $n$ is the number of labile hydrogen atoms, then the new intermediates produced by the addition have the general formula $$H_{n-m}X-(-\underset{|}{\overset{|}{C}}.CH=CH-\underset{|}{C}-CN)_m$$

where $m$ is the number of moles of the butadiene nitrile which have combined. In the case of using 1.3-butadiene-4-nitrile itself, the new intermediates have the general formula $$H_{n-m}X-(-CH_2-CH=CH-CH_2-CN)$$

where $X$, $m$ and $n$ have the same significance.

The following examples illustrate the invention but are not to be considered as limiting it in any way. In all the examples the parts are by weight and the butadiene nitrile is stabilised with hydroquinone.

Example 1

To 40 parts of diethyl malonate were added 0.3 part of metallic sodium previously dissolved in a minimum quantity of absolute ethyl alcohol. The mixture was then diluted with 48 parts of absolute ether and 9 parts of 1.3-butadiene-4-nitrile added slowly whilst stirring vigorously. The mixture was then maintained boiling under reflux for 4 hours. The resulting solution was allowed to cool, filtered and diluted with a further 70 parts of ether. The solution was then washed with water, separated from the water layer and dried over anhydrous sodium sulphate. The ether was removed under atmospheric pressure and the residual oil fractionated under vacuum to remove unreacted diethyl malonate (120° at 37 mm.) and the fraction (17.5 parts) boiling at 144–150° C. at about 0.5 mm. was collected. This fraction was then mixed with 10 times its weight of 80% aqueous methyl alcohol and reduced with hydrogen using a palladium catalyst at atmospheric temperature and 1.5–2 atmospheres until about 1 mole of hydrogen had been absorbed. The resulting product was precipitated by addition of water, washed and hydrolysed by boiling with 25% aqueous hydrochloric acid for 20 hours, during part of this time without reflux to permit escape of ethanol. The product which separated proved to be pimelic acid (M. P. 105–106° C. after twice recrystallising from water), thus indicating that the main addition to the butadiene nitrile took place in the 1.4-positions.

An alternative procedure of hydrolysing the adduct of malonic ester and butadiene nitrile and subsequently hydrogenating yielded the same product.

Example 2

47 parts of the diethyl ester of ethyl malonic acid were reacted with 20 parts of 1.3-butadiene-4-nitrile (approximately equal moles) using the same procedure as in Example 1. The final hydrolysed product was α-ethyl pimelic acid (M. P. 42–43° C. after recrystallisation).

The same compound can be made by applying the same general procedure, using the ethyl ester of α-cyanobutyric acid (ethyl cyanacetic acid) instead of ethyl malonic ester. In a similar way α-methyl pimelic acid (M. P. 56–57.5° C.) and other α-substituted pimelic acids can be obtained starting from the methyl or other appropriately mono-substituted malonic or cyanacetic esters. Mono-substituted aceto-acetic esters may likewise be used, the product, after reduction of the residual olefinic linkage, being hydrolysed with concentrated alcoholic alkali to yield the dicarboxylic acid or with mineral acid to give the ketonic acid. The latter was characterised as the ε-acetyl caproic acid derivative by applying the haloform reaction. Thus the product from the ethyl ester of α-acetyl butyric acid (ethyl aceto-acetic acid) again gave α-ethyl pimelic acid by the haloform reaction, showing that addition had taken place in the 1,4-position.

Example 3

61 parts of nitromethane were added slowly to a solution of 56 parts of caustic potash dissolved in 200 parts of ethyl alcohol while keeping the temperature at about 5° C. When the addition was complete the mixture was allowed to warm up and, while maintaining the temperature at 40° C. and stirring, 79 parts of 1.3-butadiene-4-nitrile were added slowly during 2 hours. The temperature was maintained for a further 2 hours and then the mixture allowed to stand for 20 hours. The mixture was made just acid with aqueous sulphuric acid, the small excess of sulphuric acid precipitated with barium carbonate, the solution filtered and the alcohol evaporated. The crude addition product was then diluted with 500 parts of ethyl formate and 40 parts of Raney nickel added and hydrogenation effected at 100–120° C. and 1400 lbs. per square inch pressure. The Raney nickel was filtered off, the excess ethyl formate and alcohol removed and the product twice recrystallised from aqueous alcohol. The product, M. P. 106–108° C. and 16.2% N, was N.N'-diformyl hexamethylene diamine. Hydrolysis yielded the free diamine. Alkaline saponification of the crude addition product followed by hydrogenation in presence of ammonia and Raney nickel yielded ε-amino-caproic acid.

Example 4

500 parts of acetone were mixed with 2 parts of caustic potash dissolved in the minimium of absolute ethyl alcohol and cooled to 0° C. in an apparatus provided with an efficient stirrer. A mixture of 80 parts of 1.3-butadiene-4-nitrile with a further 500 parts of acetone was then added slowly with vigorous stirring during 2 hours while not allowing the temperature to rise above 5° C. The mixture was then allowed to warm up to room temperature while stirring and was left overnight. The excess acetone was then removed by distillation and the product hydrolysed to the free acid and reduced in aqueous methyl alcohol using Raney nickel as catalyst at room temperature. The mixture was then filtered and evaporated under reduced pressure and fractionated. The fraction boiling between 184 and 190° C. at about 17 mm. pressure was collected. It solidified on cooling and had a melting point, after recrystallisation, of 29–30° C., which indicated that it was the ε-acetyl caproic acid, confirmed by applying the haloform reaction which yielded pimelic acid.

By employing appropriate proportions of reagents, the adduct of 3 molecules of butadiene nitrile to 1 molecule of acetone may be produced.

Example 5

To a mixture of 102 parts of redistilled pentamethylene diamine and 100 parts of water, 158 parts of 1.3-butadiene-4-nitrile were added slowly while cooling. The mixture was allowed to stand for 2 hours and then heated gradually to 100° C. during ½ hour and maintained at that temperature for a further ¼ hour. The water was removed under reduced pressure and the product subjected to hydrogenation in ethyl formate in presence of Raney nickel as described in Example 3. The product was worked up by fractional distillation and proved to be a syrupy hygroscopic compound giving a picrate of M. P. 194–195° C. (N=18.61%) after recrystallisation from water.

Example 6

158 parts of 1.3-butadiene-4-nitrile and 0.50 part of Triton B (about 35% solution of trimethyl benzyl ammonium hydroxide) were charged into a vessel fitted with a stirrer, a delivery tube with a sintered glass bubbler and a cooling jacket. Hydrogen sulphide was then passed in until the air was displaced and the vessel was then closed and stirring started. During the exothermic reaction cooling was applied so as to hold the temperature between 70° and 80° C. The product was then hydrogenated at 150-160° C. and 2000 lbs. pressure in presence of ethyl formate, as in Example 3, but using a cobalt sulphide "sulphactive catalyst." The reduction product was dissolved in aqueous hydrochloric acid and re-precipitated as an oil by addition of caustic soda. It was then fractionated and the fraction boiling at 143-147° C. at about 3 mm. collected. It yielded a picrate of M. P. 176.5-177.5° C. and a dibenzoyl derivative of M. P. 96.5° C. and was mainly di-($\epsilon$-amino-n-amyl)-thio-ether.

Saponification of the crude addition product followed by hydrogenation yielded a thio-dicarboxylic acid closely similar to that obtained according to U. S. application S. No. 685,245 filed July 20, 1946 from sodium sulphide $Na_2S.9H_2O$ and $\delta$-chlor-valeronitrile followed by hydrolysis. As in the said U. S. application the thio-dicarboxylic acid may be oxidised to the corresponding sulphone.

Instead of using hydrogen sulphide in the above example, sodium sulphide or hydrosulphide or other alkali metal sulphides or hydrosulphides may be used. In a similar manner either mercaptans or their alkali metal salts may be reacted with butadiene nitrile.

Having described our invention, what we desire to secure by Letters Patent is:

1. Process for the production of intermediates, which comprises reacting in the presence of an alkaline catalyst 1.3-butadiene-4-nitrile with a compound containing a labile hydrogen atom attached to a carbon atom having an adjacent activating group to form a 1.4 addition product.

2. Process for the production of intermediates, which comprises reacting in the presence of an alkaline catalyst 1.3-butadiene-4-nitrile with a malonic ester containing at least one hydrogen atom attached to the carbon atom between the carbonyl groups to form a 1.4 addition product.

3. A process for the production of 4-cyano-2-butenyl derivatives of lower nitroalkanes which comprises reacting in an inert organic solvent 1-cyano-1,3 butadiene with a lower molecular weight nitroalkane in the presence of an alkaline catalyst, and separating the nitro olefin nitrile product.

SIDNEY JAMES ALLEN.
JAMES GORDON NAPIER DREWITT.

REFERENCES CITED

The following references are of record in the file of this patent:

UNITED STATES PATENTS

| Number | Name | Date |
|---|---|---|
| 1,992,615 | Hoffman et al. | Feb. 20, 1935 |
| 2,073,363 | Carothers et al. | Mar. 9, 1937 |
| 2,396,626 | Wiest | Mar. 12, 1946 |
| 2,413,917 | Harman | Jan. 7, 1947 |

FOREIGN PATENTS

| Number | Country | Date |
|---|---|---|
| 116,260 | Austria | Dec. 24, 1942 |

OTHER REFERENCES

Bloom et al., J. Chem. Soc., vol. 1931, pp. 2765-2774.